United States Patent
Pierpont et al.

(10) Patent No.: US 7,047,920 B2
(45) Date of Patent: May 23, 2006

(54) ENGINE VALVE ACTUATION SYSTEM AND METHOD FOR CONTROLLING WHITE SMOKE

(75) Inventors: D. Andy Pierpont, Dunlap, IL (US); Thomas J. Crowell, Metamora, IL (US)

(73) Assignee: Caterpillar, Inc., Peoria, IL (US)

( * ) Notice: Subject to any disclaimer, the term of this patent is extended or adjusted under 35 U.S.C. 154(b) by 0 days.

(21) Appl. No.: 10/735,546

(22) Filed: Dec. 12, 2003

(65) Prior Publication Data

US 2005/0126525 A1    Jun. 16, 2005

(51) Int. Cl.
*F01L 1/34* (2006.01)

(52) U.S. Cl. .................. 123/90.15; 123/90.17

(58) Field of Classification Search ............. 123/90.15, 123/90.16, 90.17, 90.31
See application file for complete search history.

(56) References Cited

U.S. PATENT DOCUMENTS

| | | | |
|---|---|---|---|
| 5,303,168 A * | 4/1994 | Cullen et al. ............... 700/299 |
| 6,045,482 A * | 4/2000 | Nishar et al. ............... 477/107 |
| 6,237,551 B1 | 5/2001 | Macor et al. | |
| 6,484,676 B1 * | 11/2002 | Shimizu et al. .......... 123/90.15 |
| 2003/0183185 A1 | 10/2003 | Sun et al. | |

* cited by examiner

*Primary Examiner*—Thomas Denion
*Assistant Examiner*—Zelalem Eshete

(57) ABSTRACT

The present invention provides a method and apparatus for controlling an intake engine valve capable of variable closing timing. A condition indicative of white smoke production is determined. An intake engine valve is closed at a first crank angle for a given engine operating condition when the condition indicative of white smoke production does not exist. The intake valve is closed at a second crank angle for the given engine operating condition when the condition indicative of white smoke production exists. The second crank angle is less than the first crank angle.

17 Claims, 6 Drawing Sheets

ENGINE VALVE ACTUATION SYSTEM AND METHOD FOR CONTROLLING WHITE SMOKE

TECHNICAL FIELD

The present invention is directed to a system and method for actuating an engine valve. More particularly, the present invention is directed to a system and method for actuating the valves in an internal combustion engine.

BACKGROUND

An internal combustion engine, such as, for example, a diesel, gasoline, or natural gas engine, typically includes a series of intake and exhaust valves. These valves may be actuated, or selectively opened and closed, to control the amount of intake and exhaust gases that flow to and from the combustion chambers of the engine. Typically, the actuation of the engine valves is timed to coincide with the reciprocating movement of a series of pistons. For example, the intake valves associated with a particular combustion chamber may be opened when the respective piston is moving through an intake stroke. The exhaust valves associated with the particular combustion chamber may be opened when the respective piston is moving through an exhaust stroke.

The combustion process of an internal combustion engine may generate undesirable emissions, such as, for example, white smoke, particulates and oxides of nitrogen (NOx). These emissions are generated when a fuel, such as, for example, diesel, gasoline, or natural gas, is combusted within the combustion chambers of the engine. If no emission reduction systems are in place, the engine will exhaust these undesirable emissions to the environment.

An engine may include many different types of emission reduction systems to reduce the amount of emissions exhausted to the environment. For example, the engine may include an engine gas recirculation system and/or an aftertreatment system. Unfortunately, while these emission reduction systems may effectively reduce the amount of emissions exhausted to the environment, these systems typically result in a decrease in the efficiency of the engine.

Efforts are currently being focused on improving engine efficiency to counterbalance the effect of emission reduction systems. One such approach to improving engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551, a "late intake" Miller cycle may be implemented in such a cam arrangement by modifying the shape of the cam to overlap the actuation of the intake valve with the start of the compression stroke of the piston.

One problem with implementing a Miller cycle in an engine is that the resulting reduced air flow and compression ratio may negatively impact the performance of the engine under certain operating conditions, such as, for example, to create white smoke. In these types of conditions, engine performance may be enhanced by switching the operation of the engine to a convention diesel cycle. This may be accomplished with a variable valve actuation system, such as the system described in U.S. Pat. No. 6,237,551. As described, the variable valve actuation system may include a valve that is operable to selectively enable and disable a Miller cycle. This technique of switching to a conventional diesel cycle, however, removes any engine performance benefit obtained by using a Miller cycle.

SUMMARY OF THE INVENTION

It is to be understood that both the foregoing general description and the following detailed description are exemplary and explanatory only and are not restrictive of the invention, as claimed.

A method and apparatus for controlling an intake engine valve capable of variable closing timing. A condition indicative of white smoke production is determined. An intake engine valve is closed at a first crank angle for a given engine operating condition when the condition indicative of white smoke production does not exist. The intake valve is closed at a second crank angle for the given engine operating condition when the condition indicative of white smoke production exists. The second crank angle is less than the first crank angle.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
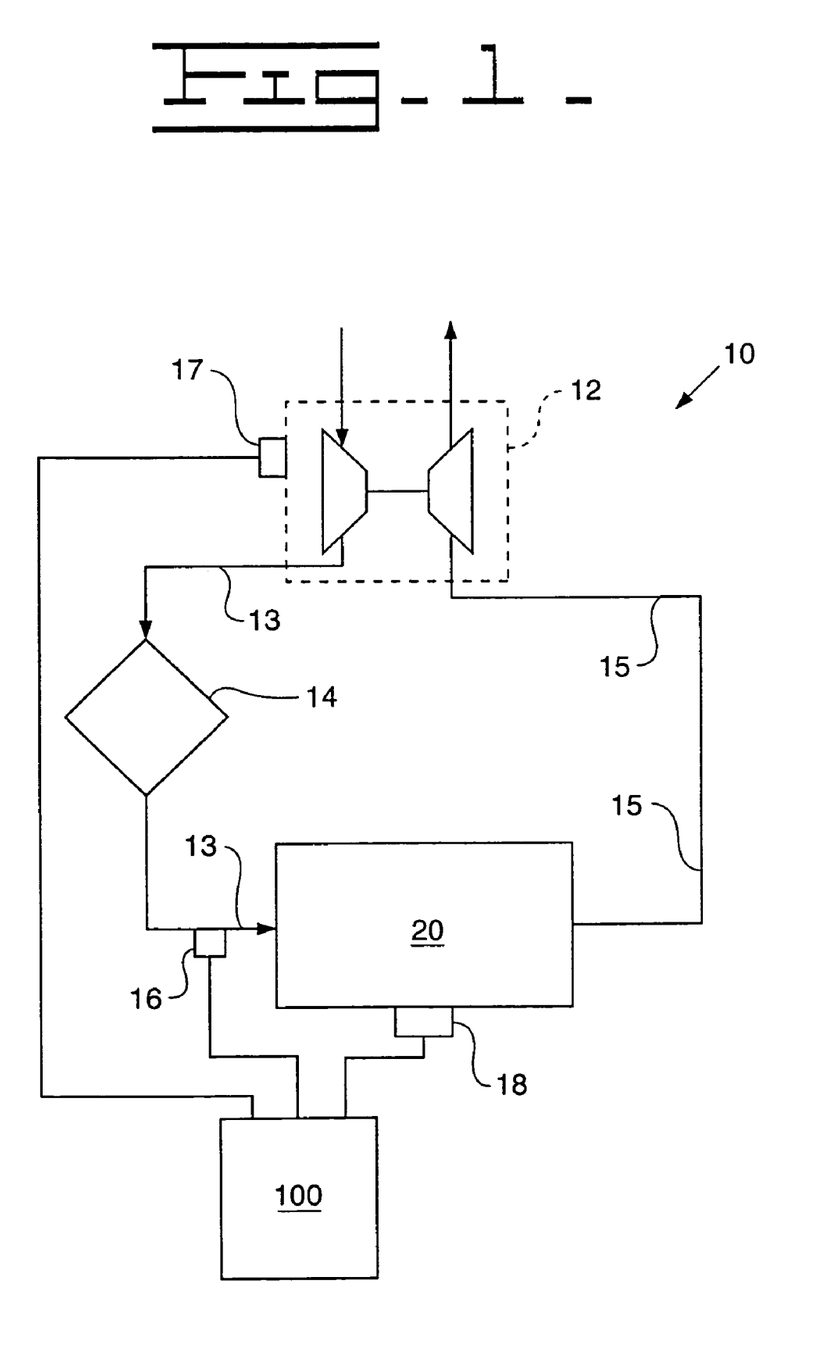
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may optionally include various components, such as, for example, a turbocharger 12 and an aftercooler 14, that are disposed in intake air passageway 13. An exhaust air passageway 15 may lead from engine 20 to turbocharger 12.

Figure 2:
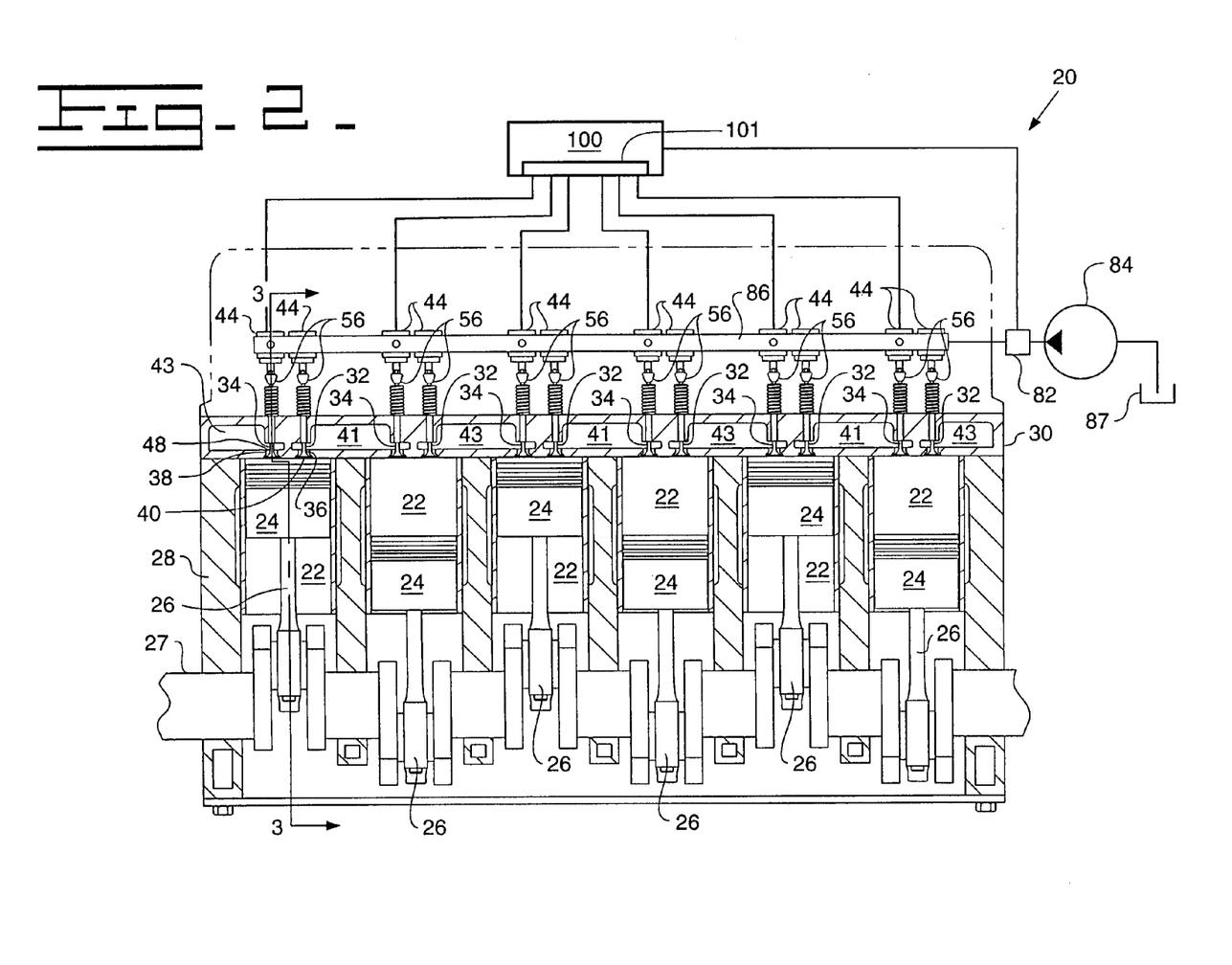
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" or "V" type configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will cause a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3:
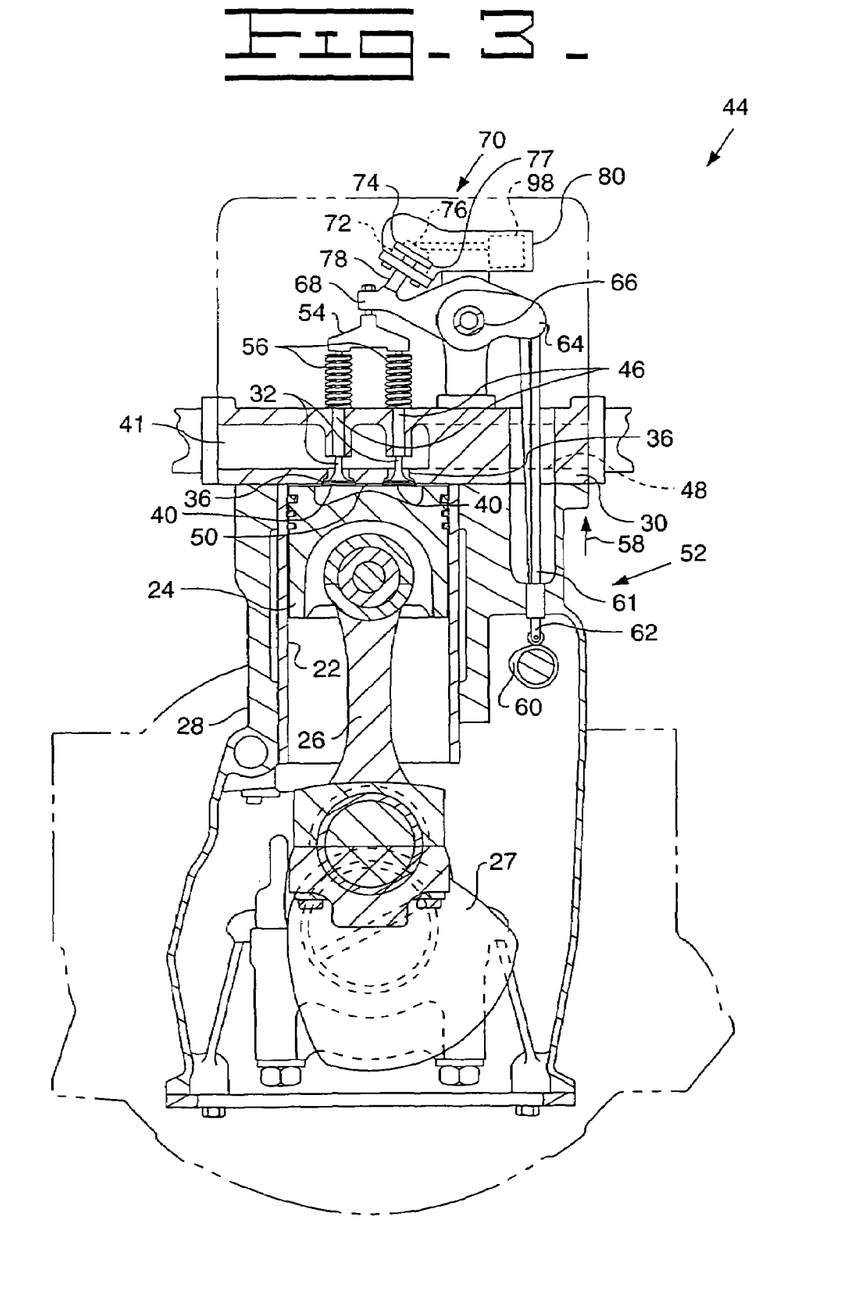
FIG. 3 is a diagrammatic cross-sectional view of a cylinder and valve actuation assembly in accordance with an exemplary embodiment of the present invention.

FIG. 3 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 2) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a series of valve actuation assemblies 44 are operatively associated with each intake valve 32 and exhaust valve 34. Each valve actuation assembly 44 is operable to open or "lift" the associated intake valve 32 or exhaust valve 34. In the following exemplary description, valve actuation assembly 44 is driven by a combination of a cam assembly 52 and a fluid actuator 70. One skilled in the art will recognize, however, that valve actuation assembly 44 may be driven by through other types of systems, such as, for example, a hydraulic actuation system, an electronic solenoid system, a piezoelectric actuation system, or any other way known to those skilled in the art.

In the exemplary embodiment of FIG. 3, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 3, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within cylinder 22 to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is advancing within cylinder 22 to allow exhaust to flow from cylinder 22 into exhaust passageway 43.

As shown in FIG. 3, valve actuation assembly 44 also includes a fluid actuator 70. Fluid actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64. Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
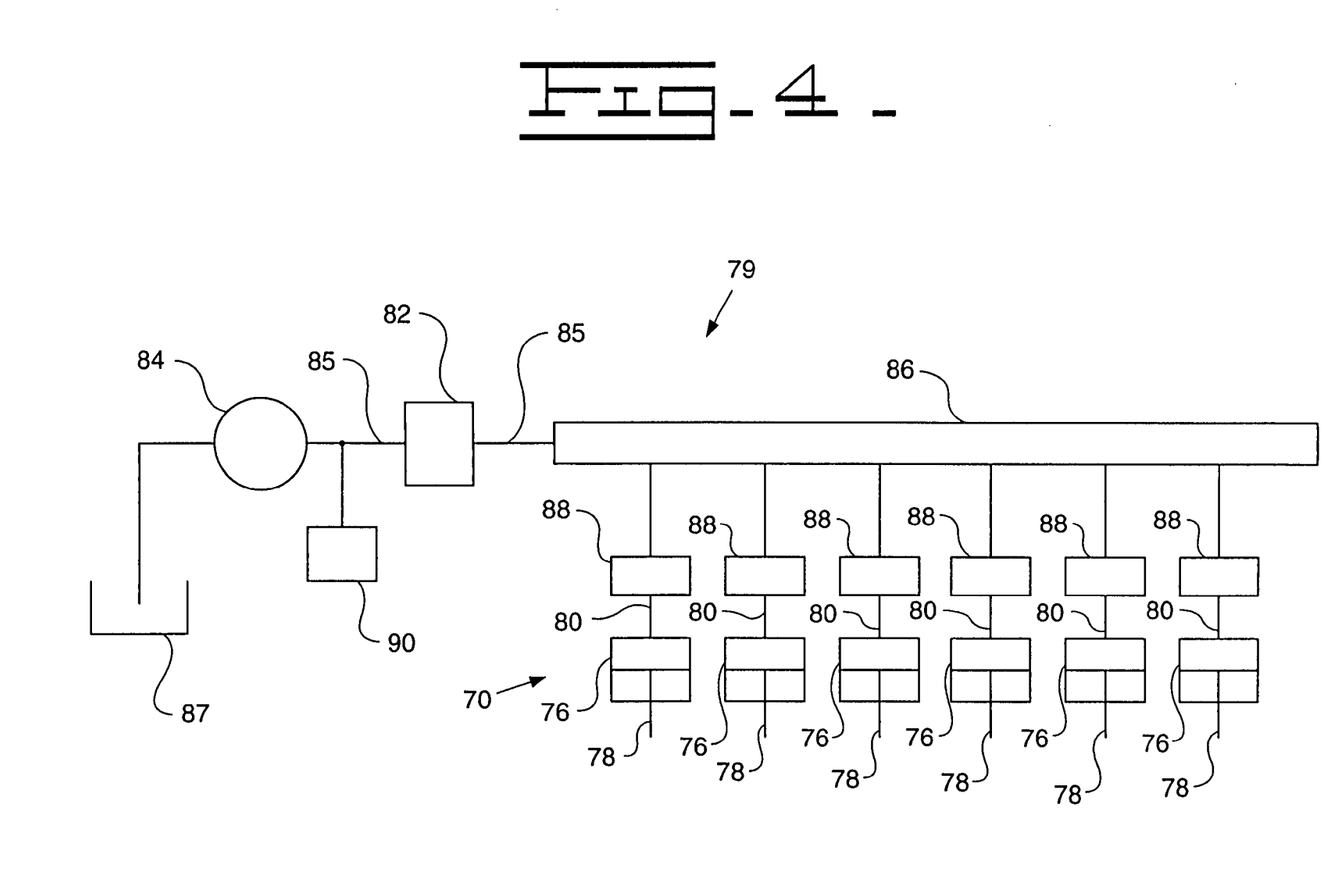
FIG. 4 is a schematic and diagrammatic representation of a fluid supply system for a fluid actuator for an engine valve in accordance with an exemplary embodiment of the present invention.

As illustrated in FIGS. 2 and 4, a source of hydraulic fluid 84 is provided to draw fluid from a tank 87 and to supply pressurized fluid to fluid actuator 70. Source of hydraulic fluid 84 may be part of a lubrication system, such as typically accompanies an internal combustion engine. Such a lubrication system may provide pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

A fluid supply system 79 connects source of hydraulic fluid 84 with fluid actuator 70. In the exemplary embodiment of FIG. 4, source of hydraulic fluid 84 is connected to a fluid rail 86 through fluid line 85. A control valve 82 is disposed in fluid line 85. Control valve 82 may be opened to allow pressurized fluid to flow from source of hydraulic fluid 84 to fluid rail 86. Control valve 82 may be closed to prevent pressurized fluid from flowing from source of hydraulic fluid 84 to fluid rail 86.

As illustrated in FIG. 4, fluid rail 86 supplies pressurized fluid from source of hydraulic fluid 84 to a series of fluid actuators 70. Each fluid actuator 70 may be associated with either the intake valves 32 or the exhaust valves 34 of a particular engine cylinder 22 (referring to FIG. 2). Fluid lines 80 direct pressurized fluid from fluid rail 86 into the actuator chamber 76 of each fluid actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will recognize that fluid supply system 79 may have a variety of different configurations and include a variety of different components. For example, fluid supply system 79 may include a check valve (not shown) placed in parallel with directional control valve 88 between control valve 82 and fluid actuator 70. In addition, fluid supply system 79 may include a source of high-pressure fluid. Fluid supply system 79 may also include a snubbing valve to control the rate of fluid flow from fluid actuator 70 and a damping system, which may include an accumulator and a restricted orifice, to prevent pressure oscillations in actuator chamber 76 and fluid line 80.

As shown in FIGS. 1 and 2, engine system 10 includes a controller 100, such as an engine valve controller. Controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

The transmitted signal may result in the selective opening and closing of directional control valve 88. If directional control valve 88 is a normally closed valve, the transmitted signal may open the valve to allow hydraulic fluid to flow to and/or from fluid actuator 70. If directional control valve 88 is a normally opened valve, the transmitted signal may close the valve to prevent fluid from flowing to and/or from fluid actuator 70.

As illustrated in FIGS. 1–4, a variety of sensors known to those skilled in the art may be operatively engaged with engine 20 and/or valve actuation assemblies 44. Each sensor is configured to monitor a particular parameter of the performance of engine 20 or valve actuation assemblies 44. Some examples of sensors include an intake manifold temperature sensor, an intake manifold pressure sensor, and an engine speed sensor. One skilled in the art may recognize that alternative sensors may be used with engine system 10 to monitor the performance of engine 20 or valve actuation assemblies 44.

As also shown in FIG. 1, at least one engine sensor 18 is operatively connected with engine 20. Engine sensor 18 may be any type of sensor commonly used to monitor engine performance. For example, engine sensor 18 may be configured to measure one or more of the following: a rotational speed of the engine, a delivered torque of the engine, a temperature of the engine, a pressure within one or more of cylinders 22, and a rotational angle of crankshaft 27.

As further shown in FIG. 1, at least one intake sensor 16 may be disposed in intake passageway 13. Intake sensor(s) 16 may be configured to sense the temperature and/or pressure of the intake air and/or the mass flow rate of the intake air. Intake sensor 16(s) may be any type of sensor readily apparent to one skilled in the art as capable of sensing these types of parameters and may be disposed at any point along intake passageway 13.

As further shown in FIG. 1, a turbocharger sensor 17 may be operatively connected with turbocharger 12. Turbocharger sensor 17 may be configured to sense the speed of the turbocharger. Turbocharger sensor 17 may also be configured to any other operational parameter of turbocharger 12.

INDUSTRIAL APPLICABILITY

Controller 100 may operate each valve actuation assembly 44 to selectively implement a late intake Miller cycle for each cylinder 22 of engine 20. Under normal operating conditions, implementation of the late intake Miller cycle will increase the overall efficiency of the engine 20. Under some operating conditions, such as, for example, when engine 20 is cold, controller 100 may operate engine 20 on a conventional diesel cycle. In other operating condtions, the controller 100 may operate the engine 20 in a normal Miller cycle. Further, when implementing a normal Miller cycle, under operating conditions indicative of white smoke production, such as, for example, a low intake manifold temperature or a low intake manifold pressure, or both, the controller 100 may operate each valve actuation assembly 44 to implement a shortened late intake Miller cycle, as will be described below.

When engine 20 is operating under a first set of predetermined operating conditions, controller 100 may implement a normal or shortened Miller cycle by selectively actuating fluid actuator 70 to hold intake valve 32 open for a first portion of the compression stroke of piston 24. This may be accomplished by transmitting a signal to move control valve 82 and directional control valve 88 to the open positions when piston 24 starts an intake stroke. This allows pressurized fluid to flow from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. When actuator chamber 76 is filled with fluid and rocker arm 64 returns intake valves 32 from the open position to the closed position, actuator rod 78 will engage end 68 of rocker arm 64.

When actuator chamber 76 is filled with fluid, directional control valve 88 may be closed. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, fluid actuator 70 will hold intake valves 32 in the open position, independently of the action of cam assembly 52.

Controller 100 may close intake valves 32 by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position. A snubbing valve may restrict the rate at which fluid exits actuator chamber 76 to reduce the velocity at which intake valves 32 are closed. This may prevent valve elements 40 from being damaged when closing intake ports 36.

When the engine operating conditions indicate that white smoke production is likely to exist, controller 100 may implement a shortened late intake Miller cycle by selectively actuating fluid actuator 70 to hold intake valve 32 open for a second portion of the compression stroke of piston 24, the second portion being less than the first portion. That is, the controller 100 closes the intake valve 32 earlier, e.g., at a lower crank angle, than it would have under the non-shortened late intake Miller cycle. Typically this crank angle will still be greater than the crank angle at which the intake valve 32 closes during a conventional diesel cycle.

Figure 5:
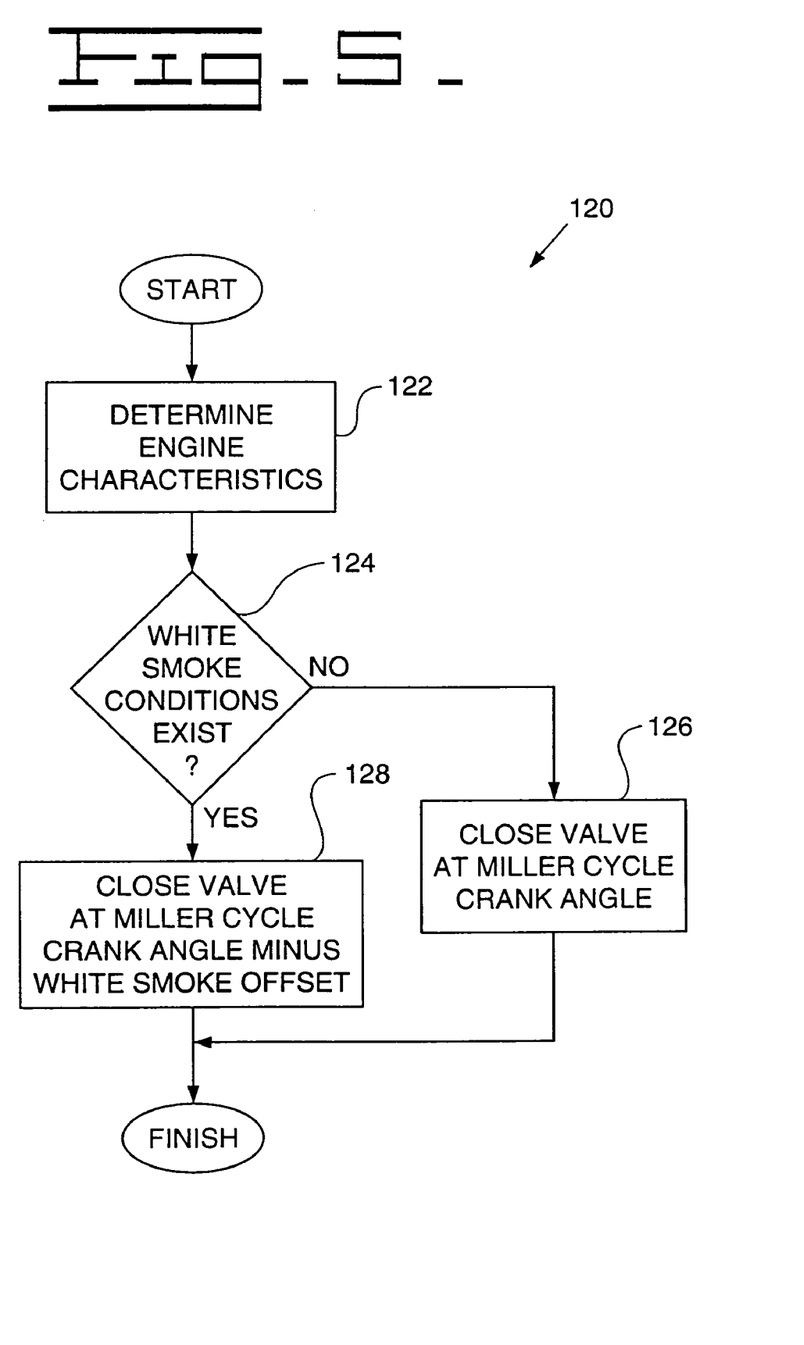
FIG. 5 is a flow chart according to one embodiment of the invention.

FIG. 5 is a flow chart 120 showing one technique for controlling an engine valve 32 according to one embodiment of the invention. In block 122, the controller 100 determines various engine operating characteristics/conditions. For example, the controller may determine the intake manifold pressure, intake manifold temperature, and engine speed, by ways known to those skilled in the art. Other engine characteristics/conditions known to those skilled in the art could also be determined.

In block 124, the controller determines whether the determined engine characteristics indicate that white smoke conditions are likely to exist. For example, a low intake manifold pressure, a low intake manifold temperature, and an excessive amount of fuel (e.g., more than needed for stoichiometric combustion) are all conditions that are more likely to produce white smoke from the engine 20. Other engine characteristics, or combinations thereof, known to those skilled in the art could also be used.

If the controller 100 determines that white smoke conditions are not likely to exist, control passes to block 126. In block 126, the controller 100 closes the intake engine valve 32 at the conventional Miller cycle crank angle.

If the controller 100 determines that white smoke conditions are likely to exist, control passes to block 128. In block 128, the controller 100 closes the intake engine valve 32 at a shortened Miller cycle crank angle, e.g., sooner than the crank angle at which a conventional Miller cycle would close the intake engine valve 32.

Figure 6:
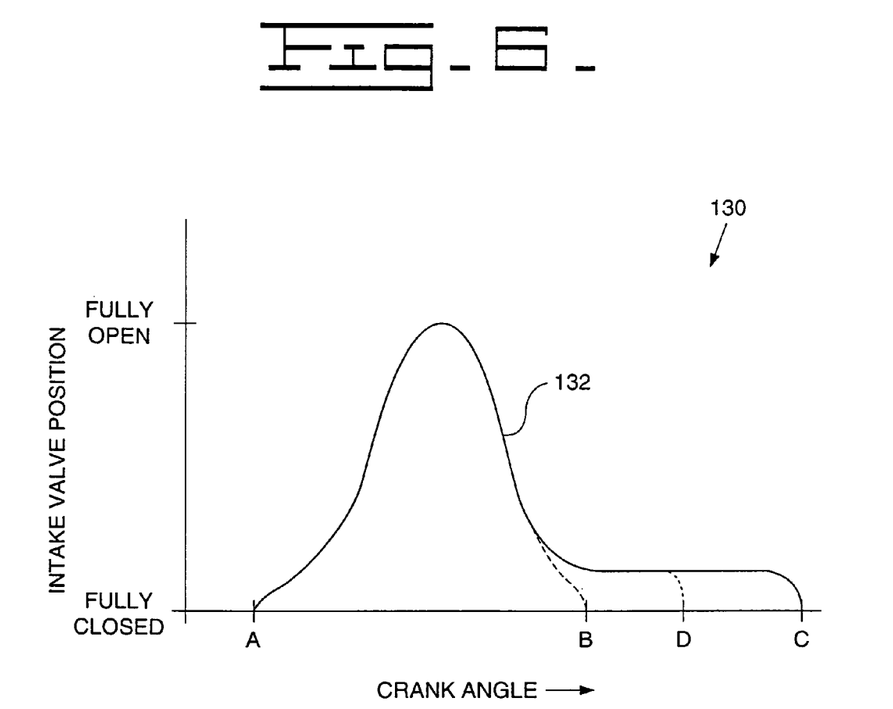
FIG. 6 is a graph according to one embodiment of the invention.

FIG. 6 is a graph 130 of intake valve position vs. crank angle according to one embodiment of the invention. At the beginning of the combustion cycle (intake stroke) the intake valve opens (point A). If the controller 100 determines that the engine 20 should be operated in a conventional diesel cycle, the position of the intake valve 32 follows the curve profile 132 shown and closes at point B. If the controller 100 determines that the engine 20 should be operated in a conventional Miller cycle, the position of the intake valve 32 follows the curve profile shown and closes at point C. If the controller 100 determines that the engine 20 should be operated in a Miller cycle, but white smoke conditions are likely to exist, the position of the intake valve 32 follows the curve profile shown and closes at point D.

For a conventional diesel cycle, the intake valve 32 may close at a crank angle of approximately 160° before top dead center ("BTDC"). For a normal Miller cycle, the intake valve 32 may close at some crank angle greater than approximately 160° before top dead center ("BTDC"). For a shortened Miller cycle, the intake valve 32 may close at a crank angle anywhere between the crank angle for a conventional diesel cycle and a normal Miller cycle.

The particular crank angle for a shortened Miller cycle may be a function of various engine-operating conditions. In particular, experimentation has shown that the engine speed may be a pertinent factor in determining this crank angle. The exact relationship between engine speed and the crank angle for closure of the intake valve 32 may vary depending on the particular characteristics of the engine design, and may be determined through experimentation.

Thus, according to one embodiment of the invention, an engine 20 may operate in a normal Miller cycle when conditions of the engine do not indicate that white smoke production is likely, and may operate in a shortened Miller cycle when conditions indicate that white smoke production is likely. Because in a normal Miller cycle the intake valve 32 closes after bottom dead center ("ABDC"), the quantity of air in the cylinders 22 is less than that if the engine 20 was operating in a conventional diesel cycle (where the intake valve 32 closes closer to or at bottom dead center. By closing the intake valve 32 earlier in the shortened Miller cycle, more air is present in the cylinder 22, leading to a higher pressure and temperature within the cylinder 22 during the combustion cycle. This, in turn, may tend to reduce the production of white smoke.

Although some examples herein describe an engine 20 capable of operating in a conventional diesel cycle, a normal Miller cycle, and a shortened Miller cycle, the invention may have application to engines that operate only in the normal Miller cycle, to thereby switch between the normal and shortened Miller cycle as conditions indicate.

It will be apparent to those skilled in the art that various modifications and variations can be made in the engine valve actuation system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being limited only by the following claims and their equivalents.

What is claimed is:

1. A method for controlling an intake engine valve capable of variable closing timing, comprising:
    opening the intake engine valve at a preestablished crank angle;
    determining a condition indicative of white smoke production;
    closing the intake engine valve at a first crank angle for a given engine operating condition when the condition indicative of white smoke production does not exist; and
    closing the intake engine valve at a second crank angle for the given engine operating condition when the condition indicative of white smoke production exists, the second crank angle being less than the first crank angle while maintaining the opening of the intake valve at the preestablished crank angle.

2. The method of claim 1 wherein the condition indicative of white smoke production comprises at least one of:
    an excess quantity of fuel injected into a combustion chamber;
    a low intake manifold pressure; and
    a low engine temperature.

3. The method of claim 2 wherein the low engine temperature comprises a low intake manifold air temperature.

4. The method of claim 1 wherein the given engine operating condition comprises:
    a first engine speed; and
    a first fuel quantity.

5. A method for controlling an intake engine valve capable of variable closing timing, comprising:
    determining a condition indicative of white smoke production;
    opening the intake valve at a preestablished crank angle;
    closing the intake valve at a first crank angle for a given engine operating condition when a condition indicative of white smoke production does not exist; and
    advancing the closing of the intake valve relative to the first crank angle when the condition indicative of white smoke production exists while maintaining the intake valve opening at the preestablished crank angle.

6. The method of claim 5 wherein the condition indicative of white smoke production comprises at least one of:
    an excess quantity of fuel injected into a combustion chamber;
    a low intake manifold pressure; and
    a low engine temperature.

7. The method of claim 6 wherein the low engine temperature comprises a low intake manifold air temperature.

8. The method of claim 5 wherein the given engine operating condition comprises:
    a first engine speed; and
    a first fuel quantity.

9. An apparatus for controlling an intake engine valve capable of variable closing timing, comprising:
    at least one sensor operable to determine an engine operating condition indicative of white smoke production, the at least one sensor operable to transmit at least one signal as a function thereof;
    an engine valve controller coupled with the at least one sensor to receive the at least one signal, the engine valve controller operable to transmit a first signal indicative of a desired timing for the closing of the intake engine valve as a function of the at least one signal indicative of white smoke production;
    opening the intake valve at a preestablished crank angle; and
    a variable intake valve actuator operable to close the intake engine valve as a function of the first signal while maintaining the opening of the intake valve at the preestablished crank angle.

10. The apparatus of claim 9 wherein the engine valve controller is operable to:
    close the intake engine valve at a first crank angle for a given engine operating condition when the condition indicative of white smoke production does not exist; and
    close the intake engine valve at a second crank angle for the given engine operating condition when the condition indicative of white smoke production exists, the second crank angle being less than the first crank angle.

11. The apparatus of claim 9, further comprising:
    at least one sensor operable to determine a second engine operating condition and to transmit at least one signal indicative thereof; and
    wherein the engine valve controller is further operable to transmit the first signal as a function of the at least one signal indicative of the second engine operating condition.

12. The apparatus of claim 11 wherein the second engine operating condition comprises at least one of:
    an excess quantity of fuel injected into a combustion chamber;
    a low atmospheric pressure; and
    a low engine temperature.

13. The apparatus of claim 9 wherein the at least one sensor comprises at least one of:
    an intake manifold temperature sensor; and
    an intake manifold pressure sensor.

14. An apparatus for controlling an intake engine valve capable of variable closing timing, comprising:
    at least one sensor operable to determine an engine operating condition indicative of white smoke production, the at least one sensor operable to transmit at least one signal as a function thereof;
    opening the intake engine valve at a preestablished crank angle;
    an engine valve controller coupled with the at least one sensor to receive the at least one signal, the engine valve controller operable to transmit a first signal indicative of a desired timing for the closing of the intake engine valve as a function of the at least one signal indicative of white smoke production;

wherein the first signal is indicative of a first crank angle when the at least one sensor is indicative of an engine operating condition not indicative of white smoke production; and wherein the first signal is indicative of a second crank angle when the at least one sensor is indicative of an engine operating condition indicative of white smoke production, the second crank angle being advanced with respect to the first crank angle while maintaining the opening of the intake engine valve at the preestablished crank angle; and a variable intake valve actuator operable to close the intake engine valve as a function of the first signal.

15. The apparatus of claim 14, further comprising:

at least one sensor operable to determine a second engine operating condition and to transmit at least one signal indicative thereof; and wherein the engine valve controller is further operable to transmit the first signal as a function of the at least one signal indicative of the second engine operating condition.

16. The apparatus of claim 15 wherein the second engine operating condition comprises at least one of:

an excess quantity of fuel injected into a combustion chamber;

a low atmospheric pressure; and a low engine temperature.

17. The apparatus of claim 14 wherein the at least one sensor comprises at least one of:

an intake manifold temperature sensor; and an intake manifold pressure sensor.

* * * * *